UNITED STATES PATENT OFFICE.

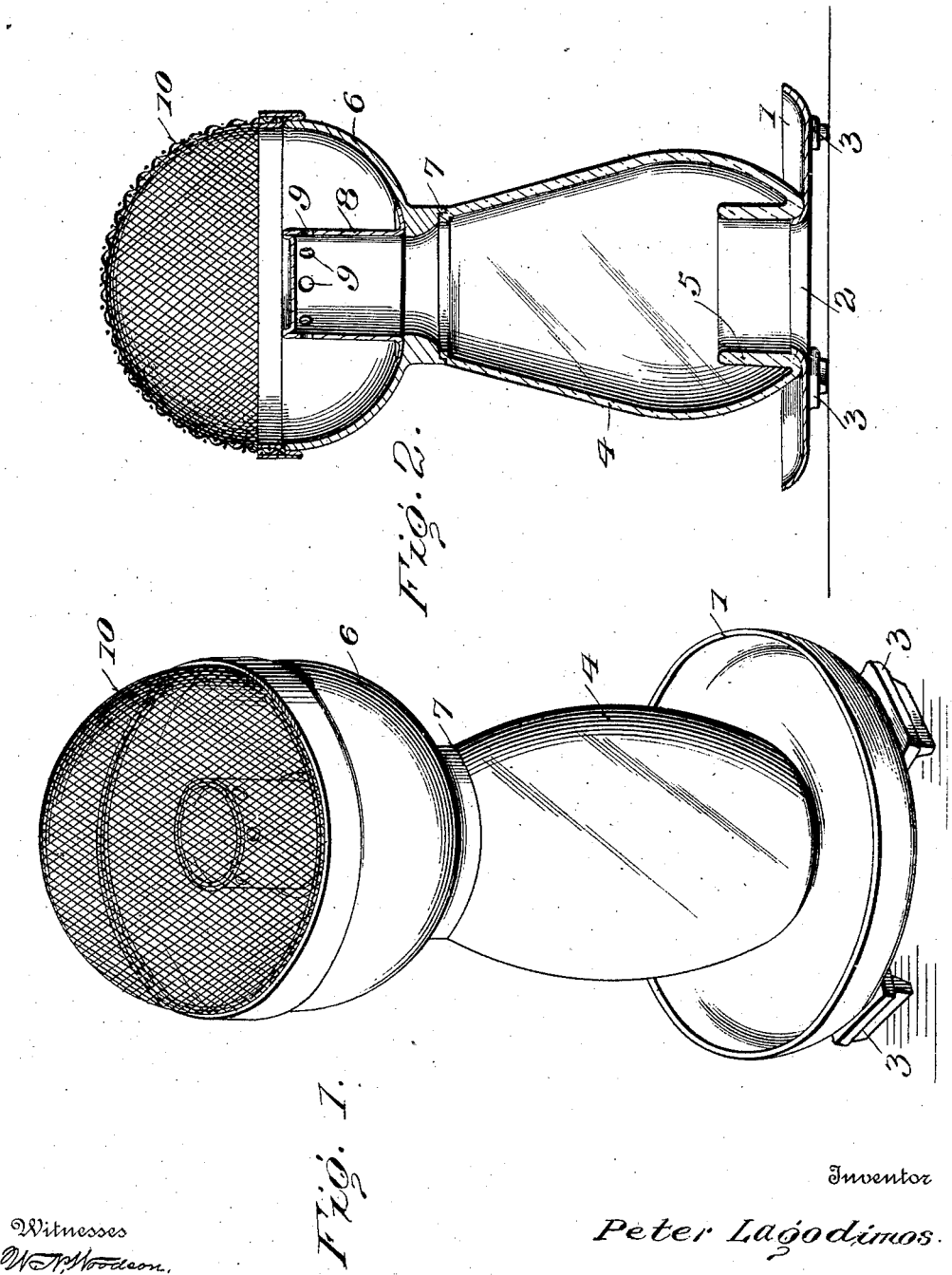

PETER LAGODIMOS, OF SALEM, MASSACHUSETTS.

FLY-TRAP.

986,833. Specification of Letters Patent. Patented Mar. 14, 1911.

Application filed September 20, 1909. Serial No. 518,516.

*To all whom it may concern:*

Be it known that I, PETER LAGODIMOS, subject of the King of Greece, residing at Salem, in the county of Essex and State of Massachusetts, have invented certain new and useful Improvements in Fly-Traps, of which the following is a specification.

The object of this invention is a simple, inexpensive and effective device for entrapping flies, and the invention consists in certain constructions and arrangements of the parts that I shall hereinafter fully describe and claim.

For a full understanding of the invention reference is to be had to the following description and accompanying drawings, in which:—

Figure 1 is a perspective view of a fly-catcher constructed in accordance with my invention, and Fig. 2 is a vertical longitudinal section thereof.

Corresponding and like parts are referred to in the following description and indicated in all the views of the accompanying drawings by the same reference characters.

My improved fly catching device embodies a base 1 which may be made of any substance or material and is preferably of saucer shape with a central opening 2 formed therein and defined by a slight upturned flange. Preferably the base 1 is provided with feet 3 by which it is held on any suitable support in a slightly elevated position.

4 designates the body portion of the device which may be of any desired substance or material preferably transparent, such as glass, and which may be of any desired size and shape, although preferably somewhat in the shape of a lamp chimney or globe, said body portion being adapted to rest on the base 1 and designed to extend around the central opening 2 of the base, the body portion being formed around its lower end with an interior upwardly projecting annular flange 5 forming a circular trough in which water or some liquid insecticide may be placed.

The top of the fly catcher is preferably constructed in two sections. The lower section 6 is formed at its bottom with a rim flange 7 adapted to fit upon the upper edge of the body portion 4 and defining an opening which extends up into the preferably cylindrical cap 8 which is preferably closed at its top and also on its side except for any desired number of relatively small openings 9. The top half or section 10 of the dome-like cage which forms the top of the device is in the present instance constructed of woven wire, although any substance may be employed which will permit sufficient light to pass through the section 10 being secured to the lower section 6 in any desired way as by the frictional contact between the two rims of the complemental sections.

In the practical use of my improved fly-catcher, sugar or some other similar substance which will tend to attract the flies is sprinkled underneath the base 1, preferably at the opening 2. This will of course attract the flies and after they have fed, they will naturally fly upward which will cause them to pass into the body portion 4, the light showing therethrough. The natural tendency of the flies will be to walk over the inner surface of the body portion 4, but if they attempt to go down through the opening in the lower end of the body portion, as they crawl downwardly along the wall of the same they will be stopped by water or some insecticide which is placed within the trough formed by the flange 5. The only outlet from the body portion 4, or rather the outlet which will be sought by the most of the flies as they crawl along the walls of the device after having entered the body portion 4 will be that leading to the cap 8 and out through the openings 9 thereof into the dome-like cage or top of the device, and here they will be effectively caught and can be killed by pouring hot water, for instance, into the cage.

From the foregoing description in connection with the accompanying drawings it will be seen that I have provided a very simple durable and efficient construction of fly-catcher which is composed of comparatively few parts that may be easily disassembled for the purpose of cleaning or the like and which will not be liable to get out of order or become broken in ordinary handling.

The rim of the saucer-like base 1 may be used as an ash-tray or for some analogous purpose. It is, of course, also evident that the rim or outer portion of the saucer-like base 1 may be used to contain liquid, whereby the flies will avoid lighting on the upper surface of the base and their crawling up the exterior of the body portion 4, the flies being thus directed down underneath the base 1, where the bait is placed and up into the body portion through the opening 2 and the opening formed by the upstanding annular flange 5 at the bottom of the body portion. Furthermore, it will be noted that the slight up-turned flange 2 which defines the central opening in the base 1, serves to properly center the body portion on the base, and holds the base properly while at the same time it permits the body portion to be easily detached from the base for the purpose of cleaning or the like.

Having thus described the invention what is claimed as new is:—

The herein described fly catcher, embodying a saucer-like base provided with relatively low feet designed to hold the base in a slightly elevated position on a support, the base being formed with a central opening extending therethrough and a slight up-turned flange defining said opening, a body portion formed with a bottom opening and an interior upstanding flange defining said opening and arranged to produce in the bottom of the body an interior annular trough, the bottom wall of the opening in the body portion being adapted to fit around the slight up-turned flange of the base so as to center the parts one upon the other, while at the same time providing a rim on the upper surface of the base which surrounds the body portion, and a cage supported on the upper end of the body portion.

In testimony whereof I affix my signature in presence of two witnesses.

PETER LAGODIMOS. [L. S.]

Witnesses:
HERBERT C. FARWELL,
IRVING E. BROWN.

---

Copies of this patent may be obtained for five cents each, by addressing the "Commissioner of Patents, Washington, D. C."